(12) United States Patent
Bearden

(10) Patent No.: US 7,058,764 B2
(45) Date of Patent: Jun. 6, 2006

(54) METHOD OF ADAPTIVE CACHE PARTITIONING TO INCREASE HOST I/O PERFORMANCE

(75) Inventor: Brian S. Bearden, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 459 days.

(21) Appl. No.: 10/414,188

(22) Filed: Apr. 14, 2003

(65) Prior Publication Data

US 2004/0205296 A1 Oct. 14, 2004

(51) Int. Cl.
*G06F 13/00* (2006.01)
*G06F 12/08* (2006.01)

(52) U.S. Cl. .................... 711/129; 711/173; 710/1; 710/34; 710/52; 710/56

(58) Field of Classification Search ............... None
See application file for complete search history.

(56) References Cited

U.S. PATENT DOCUMENTS

| | | | | |
|---|---|---|---|---|
| 5,434,992 | A * | 7/1995 | Mattson | 711/119 |
| 6,282,613 | B1 * | 8/2001 | Hsu et al. | 711/118 |
| 6,493,800 | B1 * | 12/2002 | Blumrich | 711/129 |
| 6,542,944 | B1 * | 4/2003 | D'Errico | 710/38 |
| 6,662,272 | B1 * | 12/2003 | Olarig et al. | 711/129 |
| 6,704,839 | B1 * | 3/2004 | Butterworth et al. | 711/114 |
| 6,745,295 | B1 * | 6/2004 | Rodriguez | 711/136 |
| 2004/0193397 | A1 * | 9/2004 | Lumb et al. | 703/24 |
| 2004/0194095 | A1 * | 9/2004 | Lumb et al. | 718/100 |

OTHER PUBLICATIONS

Adams, April; "IBM Enterprise Storage Server Models F10/F20"; ZDNet; Jan. 7, 2002; 5 pages; http://techupdate.zdnet.com/techupdate/stories/main/0,14179,2836789,00.html.

Revel, Dan; McNamee, Dylan; Pu, Calton; Steere, David; Walpole, Johnathan; "Feedback-based Dynamic Proportion Allocation for Disk I/O"; Department of Computer Science and Engineering, Oregon Graduate Institute of Science and Technology; Dec. 7, 2002; 5 pages.

Suh, G.E.; Rudolph, Larry; Devadas, Srinivas; "Dynamic Partitioning of Shared Cache Memory"; Klumer Academic Publisher, Netherlands; 2002; 23 pages.

Grimsrud, Knut Stener; Archibald, James K.; Nelson, Brent E; "Multiple Prefetch Adaptive Disk Caching"; IEEE Transaction on Knowledge and Data Engineering, vol. 5, Feb., 1993; pp. 88-103.

Suh, G. E.; Rudolph, Larry; Devadas, Srinivas; "Dynamic Cache Partitioning for Simultaneous Multithreading Systems"; Proceedings of the IASTED International Conference on Parallel and Distributed Computing and Systems (PDCS2001); Aug. 2001; 7 pages.

\* cited by examiner

*Primary Examiner*—Mano Padmanabhan
*Assistant Examiner*—Jasmine Song

(57) ABSTRACT

Exemplary systems, methods, and devices dynamically characterize a portion of a total cache as a read cache or a write cache in response to a host workload. Exemplary systems, methods, and devices receive a host workload parameter and allocate cache memory to either of a read cache or a write cache based on the host workload parameter.

23 Claims, 10 Drawing Sheets

METHOD OF ADAPTIVE CACHE PARTITIONING TO INCREASE HOST I/O PERFORMANCE

CROSS REFERENCE TO RELATED APPLICATIONS

The present application contains subject matter related to the following co-pending applications: "Method of Cache Collision Avoidance in the Presence of a Periodic Cache Aging Algorithm," identified by Ser. No. 10/414,180; "Method of Detecting Sequential Workloads to Increase Host Read Throughput," identified by Ser. No. 10/414,195; "Method of Adaptive Cache Pre-Fetching to Increase Host Read Throughput, identified by Ser. No. 10/414,180; and "Method of Triggering Read Cache Pre-Fetch to Increase Host Read Throughput," identified by Ser. No. 10/414,194. The foregoing applications are incorporated by reference herein, assigned to the same assignee as this application and filed on even date herewith.

TECHNICAL FIELD

The present disclosure relates to data storage, and more particularly, to data caching.

BACKGROUND

Computer data storage devices, such as disk drives and Redundant Array of Independent Disks (RAID), typically use a cache memory in combination with mass storage media (e.g., magnetic tape or disk) to save and retrieve data in response to requests from a host device. Cache memory, often referred to simply as "cache", offers improved performance over implementations without cache. Cache typically includes one or more integrated circuit memory device(s), which provide a very high data rate in comparison to the data rate of non-cache mass storage medium. Due to unit cost and space considerations, cache memory is usually limited to a relatively small fraction of (e.g., 256 kilobytes in a single disk drive) mass storage medium capacity (e.g., 256 Gigabytes). As a result, the limited cache memory should be used as efficiently and effectively as possible.

Cache is typically used to temporarily store data prior to transferring the data to an ultimate destination. For example, a read cache is often used to temporarily store data that is destined for the host device. In addition, a write cache is typically used to temporarily store data from the host device that is destined for the mass storage medium. Thus, cache is typically divided into a read cache portion and a write cache portion. Data in cache is typically processed on a page basis. The size of a page is generally fixed in a particular implementation; a typical page size is 64 kilobytes.

Because the cache is limited in size, the read cache and write cache are typically limited to predetermined, fixed sizes. Typically, the fixed sizes of the read cache and the write cache are selected at storage device manufacture time or initialization time. The sizes of the read and write cache are generally chosen based on what the manufacturer or seller believe will be a typical host workload. For example, if the manufacturer thinks that the typical or most commonly encountered workload will be host read workloads, the manufacturer may allocate more of the limited cache to the read cache. Of course, during operation, the actual host workload may not be the workload type for which the cache was allocated. Thus, in a typical storage device, the apportionment of cache between read cache and write cache is fixed during operation, regardless of what the actual host workload encountered.

SUMMARY

It is with respect to the foregoing and other considerations, that various exemplary systems, devices and/or methods have been developed and are presented herein.

One exemplary system dynamically characterizes a portion of a total cache as a read cache or a write cache in response to a host workload.

An exemplary method involves receiving a host workload parameter and dynamically partitioning limited cache memory to either of a read cache or a write cache based on the host workload parameter.

DETAILED DESCRIPTION

Various exemplary systems, devices and methods are described herein, which employ a module(s) for dynamically characterizing a portion of a total, limited cache to one of a plurality of types of cache, such as read cache or write cache. More specifically, one or more module(s) employ operations to assign a portion of total cache to either read cache or write cache based on operational parameters. More specifically still, a portion of cache may be assigned to read or write cache by partitioning the cache into a read cache and write cache. Still more specifically, cache pages in the read or write cache may be checked for availability prior to characterizing them as either read cache or write cache.

Figure 1:
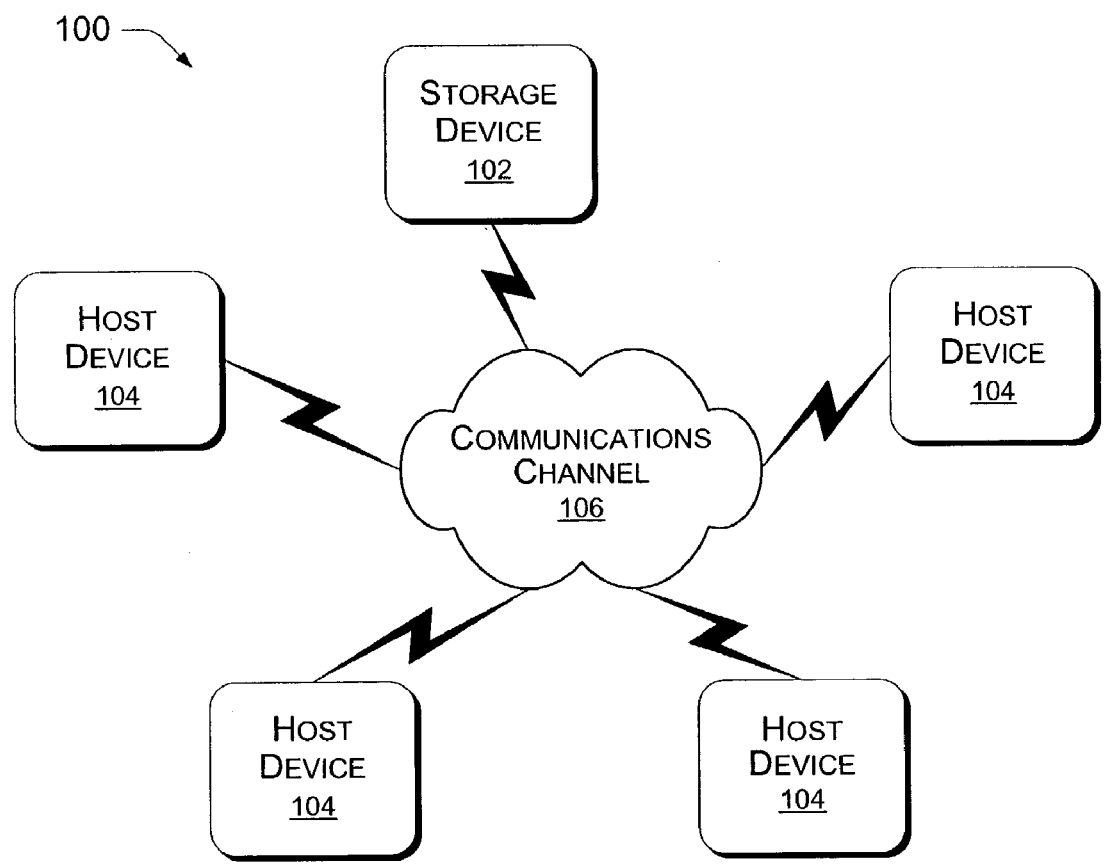
FIG. 1 illustrates a system environment that is suitable for managing cache in a storage device such that cache collisions are minimized.

FIG. 1 illustrates a suitable system environment 100 for dynamically characterizing a portion of a total, limited cache to one of a plurality of types of cache, based in part on workloads that may arise from one or more host devices 104. The storage device 102 may utilize a limited amount of cache memory in responding to request(s) from the one or more host devices 104. By dynamically characterizing sections of the limited cache based on operational parameters, such as host workload, input/output (I/O) performance of the storage device 102 may improve.

Dynamically characterizing a portion of cache refers to classifying the portion of cache for a particular purpose or use. For example, if a portion of cache is characterized as read cache, that portion will be use to carry out functions related to read caching, such as read cache pre-fetching. As another example, if a portion of cache is characterized as write cache, that portion will be use to carry out functions related to write caching, such as temporarily storing data from the host 104 and later de-staging the data. A portion of cache that is characterized one way (e.g., read cache) may later be re-characterized another way (e.g., write cache). By dynamically characterizing (and re-characterizing) portions of cache memory in response to operational parameters, storage performance goals are more likely to be achieved than if cache memory is not dynamically characterized.

Storage performance goals may include mass storage, low cost per stored megabyte, high input/output performance, and high data availability through redundancy and fault tolerance. The storage device 102 may be an individual storage system, such as a single hard disk drive, or the storage device 102 may be an arrayed storage system having more than one storage system or device. Thus, the storage devices 102 can include one or more storage components or devices operatively coupled within the storage device 102, such as magnetic disk drives, tape drives, optical read/write disk drives, solid state disks and the like.

The system environment 100 of FIG. 1 includes a storage device 102 operatively coupled to one or more host device (s) 104 through a communications channel 106. The communications channel 106 can be wired or wireless and can include, for example, a LAN (local area network), a WAN (wide area network), an intranet, the Internet, an extranet, a fiber optic cable link, a direct connection, or any other suitable communication link. Host device(s) 104 can be implemented as a variety of general purpose computing devices including, for example, a personal computer (PC), a laptop computer, a server, a Web server, and other devices configured to communicate with the storage device 102.

In one implementation, one or more hosts 104 transmit requests to the storage device 102 to store and/or retrieve data on and from the storage device 102. One type of host request is a read request to read data from the storage device 102. Another type of host request is a write request to store data in or on the storage device 102. The requests from the hosts 104 are directed to logical units and/or logical block addresses. The storage device 102 typically does not distinguish between the hosts 104. The storage device 102 typically does not use information regarding the particular applications, processes, or threads running on the hosts 104 that generate the read or write requests. From the perspective of the storage device 102, all the requests from the hosts 104 are aggregated into an aggregate host workload.

With regard to read requests, a read request typically indicates an address from which to retrieve data in the storage device 102 and an amount of data to read. In one implementation, the host address is in the form of a logical block address (LBA). The host address may also include a logical unit (LUN), indicating a particular storage unit in the storage device. The amount of data to be read may be designated by a number of bytes, pages, blocks, or otherwise. Other forms of host addresses and data sizes may be employed.

Whatever the form of the host read request, when the storage device 102 receives the read request, the storage device 102 retrieves the requested data from a mass storage media (such as a disk or tape) or a cache memory. The storage device 102 may parse the read request into various component parts, such as the address and the amount of data requested. In one implementation, the storage device then determines whether the requested data is in the cache memory, and if so, retrieves the requested data from the cache memory; however, if the requested data is not in the cache memory, the storage device 102 retrieves the data from the mass storage media. In a particular disk drive implementation, retrieving the data from the disk(s) involves mapping the given host address (such as LBA/LUN) to another form, such as Physical Cylinder/Head/Sector (PCHS) where the requested data actually resides.

A series of host requests may be characterized as sequential or random. Sequential and random generally refers to where requested data is logically located in memory relative to other requested data. Any of various known algorithms may be used which can determine whether a series of host requests are sequential or random. A series of sequentially related requests is referred to as a sequential host workload. Methods of detecting sequential workloads are discussed in a concurrently filed, co-assigned U.S. Patent Application entitled, "Method of Detecting Sequential Workloads to Increase Host Read Throughput."

Various exemplary systems and/or methods disclosed herein may apply to various types of storage devices 102 that employ a range of storage components as generally discussed above. In addition, storage devices 102 as disclosed herein may be virtual storage array devices that include a virtual memory storage feature. Thus, the storage devices 102 presently disclosed may provide a layer of address mapping indirection between host 104 addresses and the actual physical addresses where host 104 data is stored within the storage device 102. Address mapping indirection may use pointers or other dereferencing, which make it possible to move data around to different physical locations within the storage device 102 in a way that is transparent to the host 104.

As an example, a host device 104 may store data at host address $H_5$, which the host 104 may assume is pointing to the physical location of sector #56 on disk #2 on the storage device 102. However, the storage device 102 may move the host data to an entirely different physical location (e.g., disk #9, sector #27) within the storage device 102 and update a pointer (i.e., layer of address indirection) so that it always points to the host data. The host 104 may continue accessing the data using the same host address $H_5$, without having to know that the data has actually resides at a different physical location within the storage device 102.

In addition, the storage device 102 may utilize cache memory to facilitate rapid execution of read and write operations. When the host device 104 accesses data using a host address (e.g., $H_5$), the storage device may access the data in cache, rather than on mass storage media (e.g., disk or tape). Thus, the host 104 is not necessarily aware that data read from the storage device 102 may actually come from a read cache or data sent to the storage device 102 may actually be stored temporarily in a write cache. When data is stored temporarily in write cache, the storage device 102 may notify the host device 104 that the data has been saved, and later de-stage, or write the data from the write cache onto mass storage media.

Figure 2:
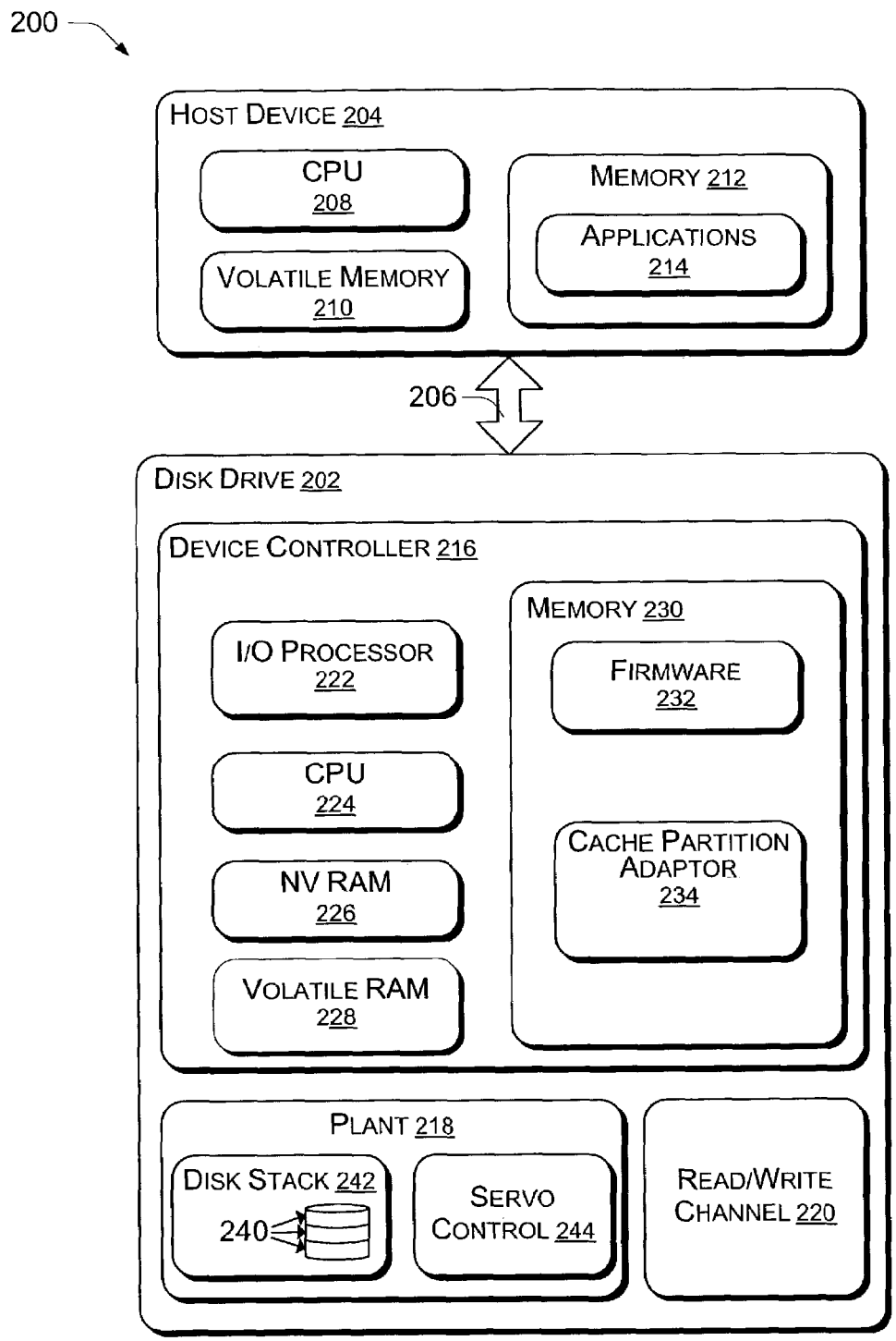
FIG. 2 is a block diagram illustrating in greater detail, a particular implementation of a host computer device and a storage device as might be implemented in the system environment of FIG. 1.

FIG. 2 is a functional block diagram illustrating a particular implementation of a host computer device 204 and a storage device 202 as might be implemented in the system environment 100 of FIG. 1. The storage device 202 of FIG. 2 is embodied as a disk drive. While the methods and systems for adapting a cache partition are discussed in FIG. 2 with respect to a disk drive implementation, it will be understood by one skilled in the art that the methods and systems may be applied to other types of storage devices, such as tape drives, CD-ROM, and others.

The host device 204 is embodied generally as a computer such as a personal computer (PC), a laptop computer, a server, a Web server, or other computer device configured to communicate with the storage device 202. The host device 204 typically includes a processor 208, a volatile memory 210 (i.e., RAM), and a nonvolatile memory 212 (e.g., ROM, hard disk, floppy disk, CD-ROM, etc.). Nonvolatile memory 212 generally provides storage of computer readable instructions, data structures, program modules and other data for the host device 204. The host device 204 may implement various application programs 214 stored in memory 212 and executed on the processor 208 that create or otherwise access data to be transferred via a communications channel 206 to the disk drive 202 for storage and subsequent retrieval.

Such applications 214 might include software programs implementing, for example, word processors, spread sheets, browsers, multimedia players, illustrators, computer-aided design tools and the like. Thus, host device 204 provides a regular flow of data I/O requests to be serviced by the disk drive 202. The communications channel 206 may be any bus structure/protocol operable to support communications between a computer and a disk drive, including, Small Computer System Interface (SCSI), Extended Industry Standard Architecture (EISA), Peripheral Component Interconnect (PCI), Attachment Packet Interface (ATAPI), and the like.

The disk drive 202 is generally designed to provide data storage and data retrieval for computer devices such as the host device 204. The disk drive 202 may include a controller 216 that permits access to the disk drive 202. The controller 216 on the disk drive 202 is generally configured to interface with a disk drive plant 218 and a read/write channel 220 to access data on one or more disk(s) 240. Thus, the controller 216 performs tasks such as attaching validation tags (e.g., error correction codes (ECC)) to data before saving it to disk(s) 240 and checking the tags to ensure data from a disk(s) 240 is correct before sending it back to host device 104. The controller 216 may also employ error correction that involves recreating data that may otherwise be lost during failures.

The plant 218 is used herein to include a servo control module 244 and a disk stack 242. The disk stack 242 includes one or more disks 240 mounted on a spindle (not shown) that is rotated by a motor (not shown). An actuator arm (not shown) extends over and under top and bottom surfaces of the disk(s) 240, and carries read and write transducer heads (not shown), which are operable to read and write data from and to substantially concentric tracks (not shown) on the surfaces of the disk(s) 240.

The servo control module 244 is configured to generate signals that are communicated to a voice coil motor (VCM) that can rotate the actuator arm, thereby positioning the transducer heads over and under the disk surfaces. The servo control module 244 is generally part of a feedback control loop that substantially continuously monitors positioning of read/write transducer heads and adjusts the position as necessary. As such, the servo control module 244 typically includes filters and/or amplifiers operable to condition positioning and servo control signals. The servo control module 244 may be implemented in any combination of hardware, firmware, or software.

The definition of a disk drive plant can vary somewhat across the industry. Other implementations may include more or fewer modules in the plant 218; however, the general purpose of the plant 218 is to provide the control to the disk(s) 240 and read/write transducer positioning, such that data is accessed at the correct locations on the disk(s). The read/write channel 220 generally communicates data between the device controller 216 and the transducer heads (not shown). The read/write channel may have one or more signal amplifiers that amplify and/or condition data signals communicated to and from the device controller 216.

Generally, accessing the disk(s) 240 is a relatively time-consuming task in the disk drive 202. The time-consuming nature of accessing (i.e., reading and writing) the disk(s) 240 is at least partly due to the electromechanical processes of positioning the disk(s) 240 and positioning the actuator arm. Time latencies that are characteristic of accessing the disk(s) 240 are more or less exhibited by other types of mass storage devices that access mass storage media, such as tape drives, optical storage devices, and the like.

As a result, mass storage devices, such as the disk drive 202, may employ cache memory to facilitate rapid data I/O responses to the host 204. Cache memory, discussed in more detail below, may be used to store pre-fetched data from the disk(s) 240 that will most likely be requested in the near future by the host 204. Cache may also be used to temporarily store data that the host 204 requests to be stored on the disk(s) 240.

The controller 216 on the storage device 202 typically includes I/O processor(s) 222, main processor(s) 224, volatile RAM 228, nonvolatile (NV) RAM 226, and nonvolatile memory 230 (e.g., ROM, flash memory). Volatile RAM 228 provides storage for variables during operation, and may store read cache data that has been pre-fetched from mass storage. NV RAM 226 may be supported by a battery backup (not shown) that preserves data in NV RAM 226 in the event power is lost to controller(s) 216. As such, NV RAM 226 generally stores data that should be maintained in the event of power loss, such as write cache data. Nonvolatile memory 230 may provide storage of computer readable instructions, data structures, program modules and other data for the storage device 202.

Accordingly, the nonvolatile memory 230 includes firmware 232 and a cache partition adaptor 234 that facilitates caching operations. Firmware 232 is generally configured to execute on the processor(s) 224 and support normal storage device 202 operations. Firmware 232 may also be configured to handle various fault scenarios that may arise in the disk drive 202. In the implementation of FIG. 2, the cache partition adaptor 234 is configured to execute on the processor(s) 224 to analyze various parameters that may affect read cache hit performance, as is more fully discussed herein below.

The I/O processor(s) 222 receives data and commands from the host device 204 via the communications channel 206. The I/O processor(s) 222 communicate with the main processor(s) 224 through standard protocols and interrupt procedures to transfer data and commands between NV RAM 226 and the read/write channel 220 for storage of data on the disk(s) 240.

As indicated above, the implementation of a storage device 202 as illustrated by the disk drive 202 in FIG. 2, includes a cache partition adaptor 234 operable to characterize portions of cache memory by dynamically partitioning the cache memory. The cache partition adaptor 234 is configured to perform several tasks during the normal operation of storage device 202. One of the tasks that the cache partition adaptor 234 may perform is that of generating various parameters or metrics indicative of the performance of the storage device 202. The cache partition adaptor 234 may characterize or re-characterize portions of cache in response to the parameters or metrics. Using the parameters and metrics, the cache partition adaptor 234 may identify various types of host workloads and responsively allocate portions of cache to various uses, such as read cache and write cache.

Read cache pre-fetching generally includes fetching data from a mass storage media, such as one or more disk(s), before a host requests the data. The pre-fetched data may be stored in a cache memory to facilitate rapid output when the host requests the data. The pre-fetched data may be fetched, stored, and retrieved on a page-by-page basis. The size of a page may be any amount of data suitable for a particular implementation. Pre-fetching may also include updating an index table (such as a hash table) that relates host addresses to data that resides in the cache. Read cache pre-fetching may be carried out by executable code, executing a pre-fetching process on the CPU 224.

Figure 3:
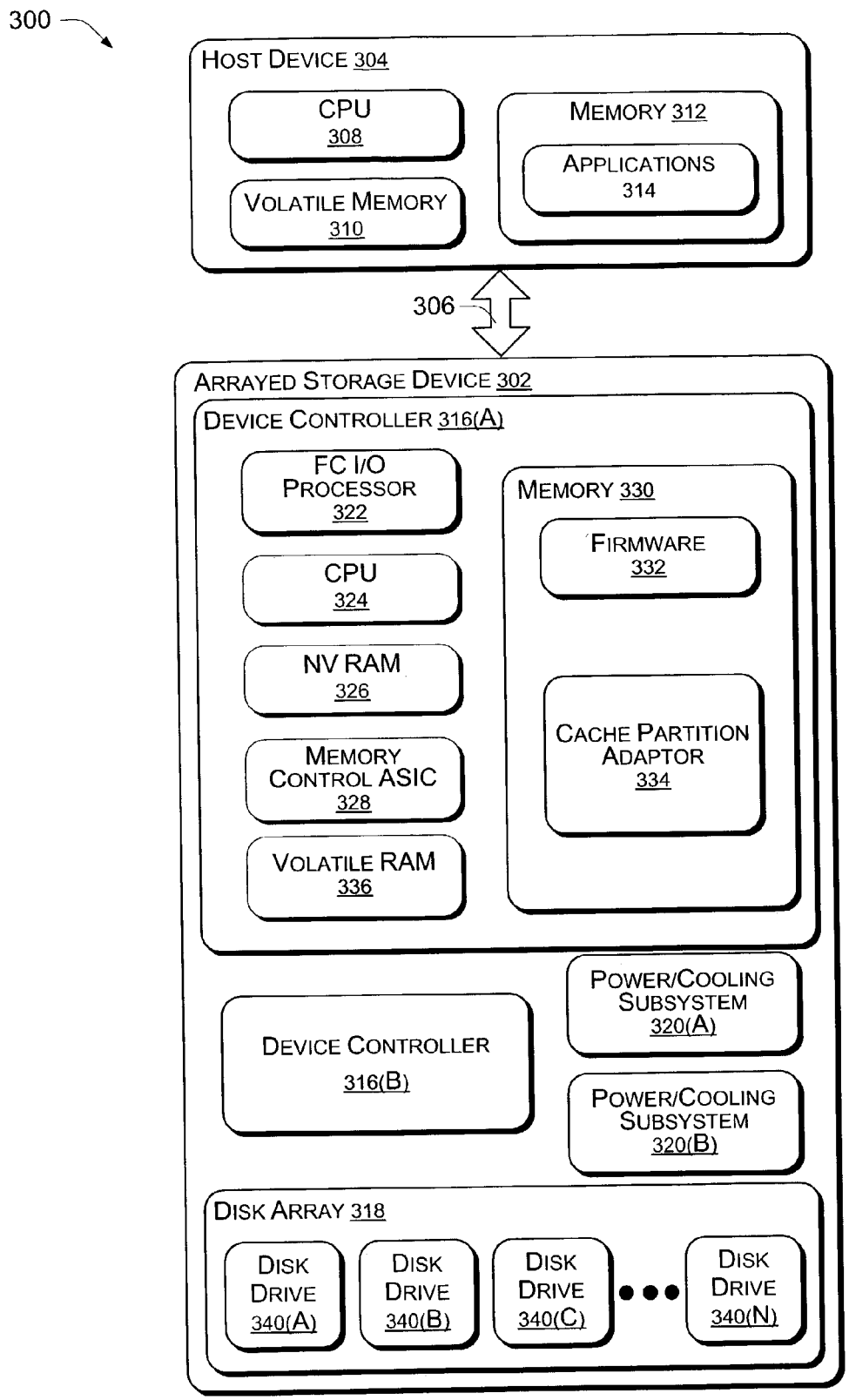
FIG. 3 is a block diagram illustrating in greater detail, another implementation of a host computer device and a storage device as might be implemented in the system environment of FIG. 1.

FIG. 2 illustrates an implementation involving a single disk drive 202. An alternative implementation may be a Redundant Array of Independent Disks (RAID), having an array of disk drives and more than one controller. As is discussed below, FIG. 3 illustrates an exemplary RAID implementation.

RAID systems are specific types of virtual storage arrays, and are known in the art. RAID systems are currently implemented, for example, hierarchically or in multi-level arrangements. Hierarchical RAID systems employ two or more different RAID levels that coexist on the same set of disks within an array. Generally, different RAID levels provide different benefits of performance versus storage efficiency.

For example, RAID level 1 provides low storage efficiency because disks are mirrored for data redundancy, while RAID level 5 provides higher storage efficiency by creating and storing parity information on one disk that provides redundancy for data stored on a number of disks. However, RAID level 1 provides faster performance under random data writes than RAID level 5 because RAID level 1 does not require the multiple read operations that are necessary in RAID level 5 for recreating parity information when data is being updated (i.e. written) to a disk.

Hierarchical RAID systems use virtual storage to facilitate the migration (i.e., relocation) of data between different RAID levels within a multi-level array in order to maximize the benefits of performance and storage efficiency that the different RAID levels offer. Therefore, data is migrated to and from a particular location on a disk in a hierarchical RAID array on the basis of which RAID level is operational at that location. In addition, hierarchical RAID systems determine which data to migrate between RAID levels based on which data in the array is the most recently or least recently written or updated data. Data that is written or updated least recently may be migrated to a lower performance, higher storage-efficient RAID level, while data that is written or updated the most recently may be migrated to a higher performance, lower storage-efficient RAID level.

In order to facilitate efficient data I/O, many RAID systems utilize read cache and write cache. The read and write cache of an arrayed storage device is generally analogous to the read and write cache of a disk drive discussed above. Caching in an arrayed storage device, however, is complicated by the fact that it introduces another layer of caching in addition to the caching that may be performed by the underlying disk drives. In order to take full advantage of the benefits offered by an arrayed storage device, such as speed and redundancy, a cache partition adaptor may adapt cache allocation or apportionment in response to operational parameters and/or metrics. The implementation discussed with respect to FIG. 3 includes a cache partition adaptor to facilitate effective use of the cache memory.

FIG. 3 is a functional block diagram illustrating a suitable environment 300 for an implementation including an arrayed storage device 302 in accordance with the system environment 100 of FIG. 1. "Arrayed storage device" 302 and its variations, such as "storage array device", "array", "virtual array" and the like, are used throughout this disclosure to refer to a plurality of storage components/devices being operatively coupled for the general purpose of increasing storage performance. The arrayed storage device 302 of FIG. 3 is embodied as a virtual RAID (redundant array of independent disks) device. A host device 304 is embodied generally as a computer such as a personal computer (PC), a laptop computer, a server, a Web server, a handheld device (e.g., a Personal Digital Assistant or cellular phone), or any other computer device that may be configured to communicate with RAID device 302.

The host device 304 typically includes a processor 308, a volatile memory 316 (i.e., RAM), and a nonvolatile memory 312 (e.g., ROM, hard disk, floppy disk, CD-ROM, etc.). Nonvolatile memory 312 generally provides storage of computer readable instructions, data structures, program modules and other data for host device 304. The host device 304 may implement various application programs 314 stored in memory 312 and executed on processor 308 that create or otherwise access data to be transferred via network connection 306 to the RAID device 302 for storage and subsequent retrieval.

The applications 314 might include software programs implementing, for example, word processors, spread sheets, browsers, multimedia players, illustrators, computer-aided design tools and the like. Thus, the host device 304 provides a regular flow of data I/O requests to be serviced by virtual RAID device 302.

RAID devices 302 are generally designed to provide continuous data storage and data retrieval for computer devices such as the host device(s) 304, and to do so regardless of various fault conditions that may occur. Thus, a RAID device 302 typically includes redundant subsystems such as controllers 316(A) and 316(B) and power and cooling subsystems 320(A) and 320(B) that permit continued access to the disk array 302 even during a failure of one of the subsystems. In addition, RAID device 302 typically provides hot-swapping capability for array components (i.e. the ability to remove and replace components while the disk array 318 remains online) such as controllers 316(A) and 316(B), power/cooling subsystems 320(A) and 320(B), and disk drives 340 in the disk array 318.

Controllers 316(A) and 316(B) on RAID device 302 mirror each other and are generally configured to redundantly store and access data on disk drives 340. Thus, controllers 316(A) and 316(B) perform tasks such as attaching validation tags to data before saving it to disk drives 340 and checking the tags to ensure data from a disk drive 340 is correct before sending it back to host device 304. Controllers 316(A) and 316(B) also tolerate faults such as disk drive 340 failures by recreating data that may be lost during such failures.

Controllers 316 on RAID device 302 typically include I/O processor(s) such as FC (fiber channel) I/O processor(s) 322, main processor(s) 324, volatile RAM 336, nonvolatile (NV) RAM 326, nonvolatile memory 330 (e.g., ROM, flash memory), and one or more application specific integrated circuits (ASICs), such as memory control ASIC 328. Volatile RAM 336 provides storage for variables during operation, and may store read cache data that has been pre-fetched from mass storage. NV RAM 326 is typically supported by a battery backup (not shown) that preserves data in NV RAM 326 in the event power is lost to controller(s) 316. NV RAM 326 generally stores data that should be maintained in the event of power loss, such as write cache data. Nonvolatile memory 330 generally provides storage of computer readable instructions, data structures, program modules and other data for RAID device 302.

Accordingly, the nonvolatile memory 330 includes firmware 332 and a cache partition adaptor 334 that facilitates data caching operations. Firmware 332 is generally configured to execute on the processor(s) 324 and support normal storage device 302 operations. Firmware 332 is generally configured to execute on processor(s) 324 and support normal arrayed storage device 302 operations. In one implementation the firmware 332 includes array management algorithm(s) to make the internal complexity of the array 318 transparent to the host 304, map virtual disk block addresses to member disk block addresses so that I/O operations are properly targeted to physical storage, translate each I/O request to a virtual disk into one or more I/O requests to underlying member disk drives, and handle errors to meet data performance/reliability goals, including data regeneration, if necessary. In the implementation of FIG. 3, the cache partition adaptor 334 is configured to execute on the processor(s) 324 to analyze various parameters indicative of host workload and/or system performance, as is more fully discussed herein below.

The FC I/O processor(s) 322 receives data and commands from host device 304 via the network connection 306. FC I/O processor(s) 322 communicate with the main processor (s) 324 through standard protocols and interrupt procedures to transfer data and commands to redundant controller 316(B) and generally move data between volatile RAM 336, NV RAM 326 and various disk drives 340 in the disk array 318 to ensure that data is stored redundantly. The arrayed storage device 302 includes one or more communications channels to the disk array 318, whereby data is communicated to and from the disk drives 340. The disk drives 340 may be arranged in any configuration as may be known in the art. Thus, any number of disk drives 340 in the disk array 318 can be grouped together to form disk systems.

The memory control ASIC 328 generally controls data storage and retrieval, data manipulation, redundancy management, and the like through communications between mirrored controllers 316(A) and 316(B). Memory controller ASIC 328 handles tagging of data sectors being striped to disk drives 340 in the array of disks 318 and writes parity information across the disk drives 340. In general, the functions performed by ASIC 328 might also be performed by firmware or software executing on general purpose microprocessors. Data striping and parity checking are well-known to those skilled in the art.

The memory control ASIC 328 also typically includes internal buffers (not shown) that facilitate testing of memory 330 to ensure that all regions of mirrored memory (i.e. between mirrored controllers 316(A) and 316(B)) are compared to be identical and checked for ECC (error checking and correction) errors on a regular basis. The memory control ASIC 328 notifies the processor 324 of these and other errors it detects. Firmware 332 is configured to manage errors detected by memory control ASIC 328 in a tolerant manner which may include, for example, preventing the corruption of array 302 data or working around a detected error/fault through a redundant subsystem to prevent the array 302 from crashing.

Figure 4:
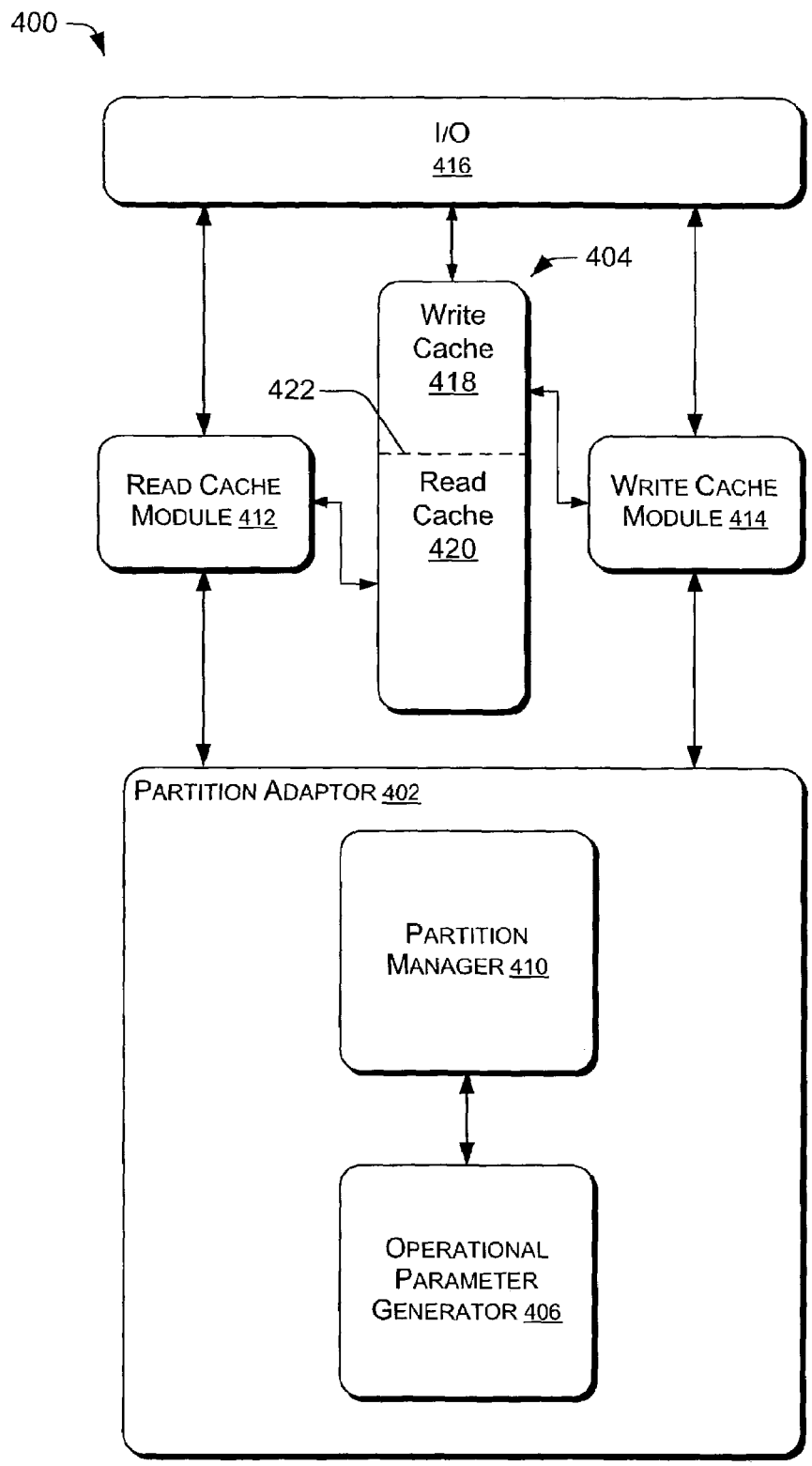
FIG. 4 illustrates an exemplary functional block diagram of a system that may reside in the system environments of FIGS. 1–3, wherein a cache partition adaptor dynamically characterizes cache in response to operational parameter(s) and/or performance metric(s).

FIG. 4 illustrates an exemplary functional block diagram of a data caching system 400 that may reside in the system environments of FIGS. 1–3, wherein a partition adaptor 402 is operable to characterize and/or re-characterize portions of a cache 404 in response to operational parameter(s). For ease of description of the system 400, the caching system 400 is described as it may execute within a storage device, such as the disk drive 202 of FIG. 2 or the RAID device 302 of FIG. 3.

In the particular implementation of FIG. 4, an operational parameter generator 406 communicates with a partition manager 410. Various cache information is communicated between a read cache module 412 and the partition manager 410 to facilitate read caching operations. Similarly, various cache information is communicated between a write cache module 414 and the partition manager 410 to facilitate write caching operations.

In one implementation, the read cache module 412 interacts with an I/O module 416 to execute various read caching operations, such as read cache pre-fetching and satisfying a host read request from the cache 404. Thus, for example, the I/O module 416 may request data from the read cache module 412 to satisfy a host read request, and the read cache module 412 may responsively communicate the requested data to the I/O module. The read cache module 412 may also request data from the I/O module 416 during a read cache pre-fetch operation, and the I/O module 416 may responsively fetch the requested data from the mass storage media and communicate the pre-fetched data to the read cache module 412, which may store the data in the cache 404.

Similarly, the write cache module 414 interacts with the I/O module 416 to execute various write caching operations, such as host data write caching and de-staging of write cache data. Thus, for example, the I/O module 416 may communicate host data to the write cache module 412 to satisfy a host write request, and the write cache module 414 may responsively store the communicated data in the cache 404. The write cache module 414 may also communicate data to the I/O module 416 during a write cache de-staging operation, and the I/O module 416 may responsively write the de-staged data to the mass storage device.

With particular reference to the cache 404, the cache 404 includes a write cache 418 and a read cache 420. A partition 422 logically divides or segments the cache 404 into two or more regions, such as the read cache 420 and the write cache 418. The cache 404 includes memory space for storing data relevant to read caching operations and write caching operations. As such, the cache 404 may include random access memory (RAM), such as the volatile RAM 228 and 336, and/or NV RAM 226 and 326 of FIGS. 2 and 3. As is discussed throughout this specification, portions of read cache 420 may be assigned to write cache 418 and vice versa. As such, in a particular implementation, the cache 404 is entirely NV RAM, in order to prevent data inconsistencies and/or loss in the event of a power failure.

In another implementation, a minimum amount of the read cache 420 is volatile RAM and the remainder of the cache 404 is NV RAM. To ensure data integrity in this implementation, the partition adaptor may take measures to ensure that the volatile RAM portion of the read cache 420 is not assigned to the write cache 418.

In yet another implementation, the cache 404 includes only volatile RAM, wherein, in the event of a power failure, the integrity of the write cache data in the write cache 418 is not ensured. This implementation may be useful in applications wherein the cost of NV RAM is too high to justify ensuring the added data integrity.

Referring now to the operational parameter generator 404, the operational parameter generator 404 obtains one or more operational parameters that are characteristic of the operation or usage of the storage device. By way of example, and not limitation, operational parameters include workload type, host request rate, number of workloads, device or component latency, device or component type or model, cache capacity, and the like. The operational parameters may be identified when the storage device is powered-up, initialized, and/or manufactured, and they may be stored in memory for later access. In addition, the operational parameters may be dynamically adjusted or periodically updated as the operation and/or usage of the storage device changes.

The operational parameter generator 404 may obtain or receive the operational parameters from parametric data stored in memory. In one implementation, the operational parameters reside in a parametric table in RAM or ROM. Thus, for example, the operational parameter generator 404 may look-up a disk drive latency, cache capacity, and/or workload type/number in the parametric table. If the table is in RAM, the operational parameters may be automatically or dynamically varied in response to changes in the storage device. The operational parameter generator 404 may or may not perform functions involved in updating and/or maintaining the parametric table. For example, a process thread may run periodically to gather operational parameters and store them in the table, so that the table is updated before other parameter generation functions in the operational parameter generator 404 execute. The process may be part of or separate from the operational parameter generator 404.

Referring to another implementation of the operational parameter generator 404, the operational parameter generator 404 receives the operational parameters from another module or process in the storage device, which gathers or has the operational parameters. In this implementation, the operational parameter generator 404 may issue a procedure call to the process or module, requesting the operational parameters. The process or module replies to the request with the operational parameters.

One particular example of an operational parameter is a host workload type. The host workload type may be represented with descriptive workload names or numbers. Thus, a random workload type may be given by type 1, a sequential host workload given by type 2, a small transfer length sequential host workload given by type 3, and so on. Alternatively, the workload names may be stored in memory as American Standard Code for Information Interchange (ASCII), or other code, characters (e.g., "RANDOM," "SEQUENTIAL", "SMALL_LENGTH_SEQ," and so on).

The operational parameters from the operational parameter generator 404 may be used later to adjust the cache partition 422 or otherwise assign pages in the cache 404 to either the write cache 418 or the read cache 420. The operational parameters may be used directly (i.e., without change) to adjust the cache partition 422. Alternatively, the operational parameters may be mapped, transformed, or otherwise used to generate performance metrics that can be used to adapt a cache 404 partition.

Referring now to the partition manager 408, the partition manager 408 is in operable communication with the operational parameter generator 404 to analyze operational data to adapt a cache partition. The partition manager 408 may transfer data, such as operational parameters, to and from the operational parameter generator 404 in order to facilitate partition adaptation. Based on the operational parameters, the partition manager 408 may adjust the size and/or location of the read cache 420 and the write cache 418. The partition manager 408 may also notify the read cache module and the write cache module of the size and/or location of the read cache 420 and the write cache 418.

In one implementation of the partition manager 408, operational parameters from the operational parameter generator 404 are used to determine whether to assign a portion of the read cache 420 to the write cache 418. In one implementation, the partition manager 408 monitors the address location of the partition 422 with a partition address variable. The partition manager 408 may adjust the partition 422 by "moving" or changing the partition address variable to refer to an address in the read cache 420, thereby extending the write cache 418. Alternatively, the partition manager 408 may increase the size of the read cache by changing the partition address variable such that the partition 422 is moved deeper into the write cache 418.

In one implementation of the partition manager 408, the partition 422 is varied in predetermined steps or deltas. The size of the steps may be in units of bytes, kilobytes, pages, blocks, or any other measure of addresses and/or data. In a particular implementation, the partition manager 408 has a predetermined step size, such as 2 pages. In this implementation, if the partition manager 408 determines that the read cache size should be increased, the partition 422 is moved 2 pages deeper into the write cache 418. Alternatively, two pages in the write cache 418 may be assigned to the read cache 420.

In a particular implementation of the partition manager 408, the partition manager maintains a list of pointers to cache page objects. In this implementation, the cache page objects refer to cache pages in the cache 404. Each of the cache page objects may include cache page descriptor information, such as, but not limited to, a page beginning address, a page ending address, an availability status flag, a cache page age variable, and a cache page type indicator. The partition manager 408 may dynamically update the descriptor information and make the cache page objects available to the read cache module 412 and/or the write cache module 414. In this implementation, because each cache page object holds its own descriptor information, including its location in the cache 404, numerous partitions (i.e., the beginning and ending of each cache page) between each of the cache pages may be maintained and dynamically modified.

The various modules illustrated in FIG. 4 may be implemented in any combination of software, hardware, or firmware. In addition, the exemplary modules, processes, and functions may be combined and/or separated in any way as is suitable to the implementation whereby the substantial utility of the system is still achieved.

Figure 5:
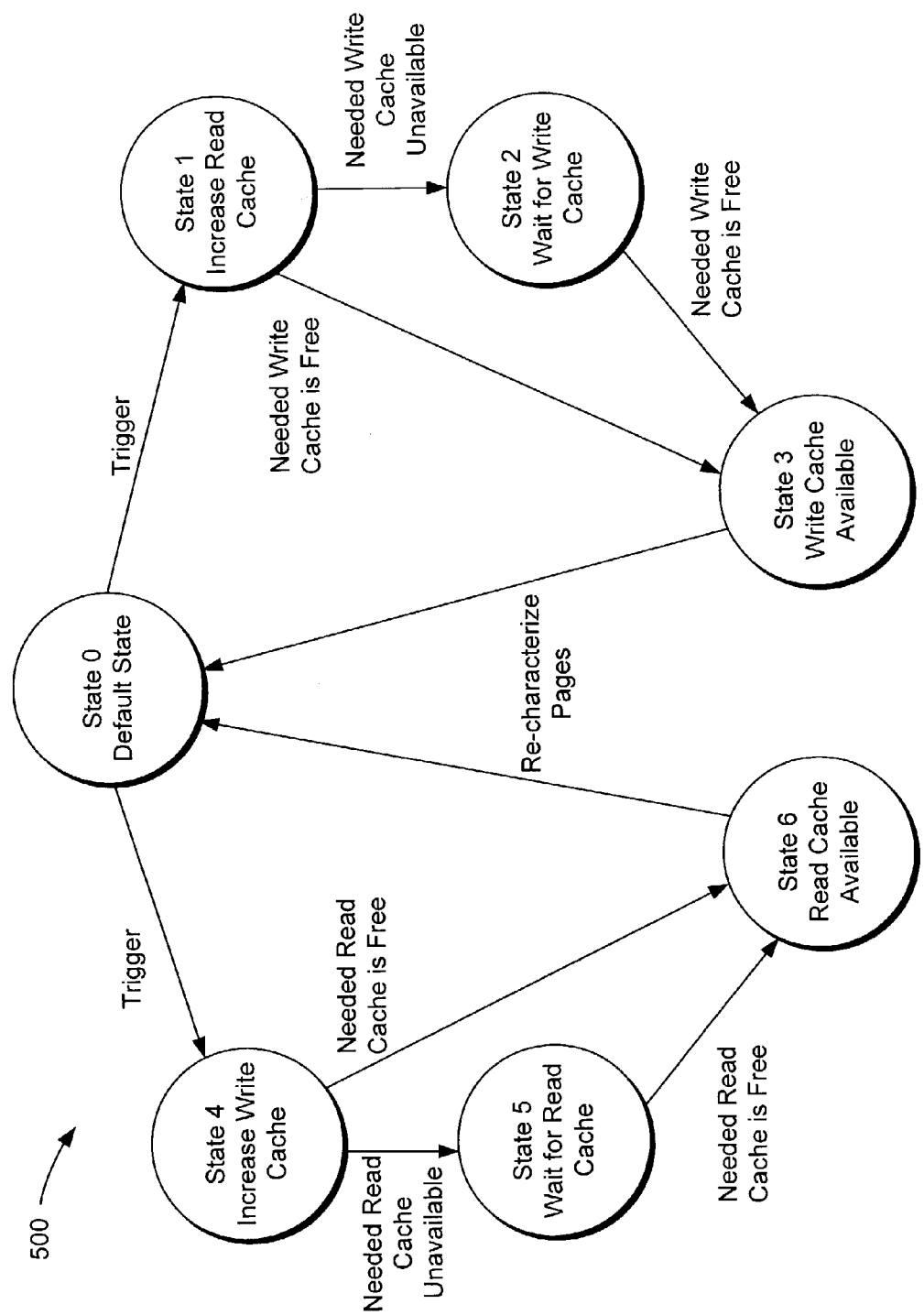
FIG. 5 is a state diagram illustrating exemplary system states that may be employed in systems shown in FIGS. 1–4 to dynamically characterize cache.

FIG. 5 is a state diagram 500 illustrating exemplary system states that may be employed in systems shown in FIGS. 1–4 to adapt read and write cache size and or location to improve host input/output (I/O) performance. Seven states, State 0–State 6, are shown, wherein read cache may be re-characterized as write cache, and write cache may be re-characterized as read cache, based on system parameters, such as host workload.

In the particular implementation shown in FIG. 5, State 0 is a default state. State 0 may be viewed as a resting state, in which the size of the read cache and the size of write cache are adapted to system parameters. In State 0, the size of the read cache is some percent, such as X %, of total cache, and the size of the write cache is the total cache size minus the size of read cache, or (100–X %). The sizes of read and write cache in State 0 may be selected at system power-up, or initialization, or the sizes of read and write cache may be dynamically determined and updated during operation.

In a particular implementation, when the system is in State 0, operational parameters and/or metrics are monitored to determine if more read or write cache is needed. The operational parameters and/or metrics may include the type of host workload, the size of host workload requests, the size of the read cache, the size of the write cache, the read cache hit ratio, and others. Variations in the operational parameters and/or metrics may cause the system to transition from State 0 to State 1 or State 4.

In one implementation of State 0, the host workload type is one parameter that is monitored. The system may be designed to transition to State 1 when the host workload type is a sequential read host workload. Thus, in this implementation of State 0, the system analyzes host requests to determine if the host requests are indicative of a sequential read workload. If the system identifies or detects a sequential read workload, the system transitions to State 1. Various data may be generated during the transition from State 0 to State 1, such as a read cache page count, indicating a number of write cache pages requested to perform read caching in response to the sequential read workload.

In this implementation, State 1 is a state in which more read cache memory has been requested to be allocated to the read cache to handle the sequential read workload. As discussed above, the total amount of memory allocated to cache may be limited. While in State 1, the system may determine what percentage of the available write cache space needs to be re-characterized as read cache space. In addition, in State 1 the system may determine if the required write cache resources are available. In State 1, various functions and algorithms are employed to identify write cache pages that may be available or unavailable. Write cache pages may be unavailable for any number of reasons. For example, a write cache page may be in the process of being de-staged (i.e., written back to the mass storage media), and may be "locked" (i.e., inaccessible) during de-staging.

In one implementation of State 1, the identified available write pages are sorted by their respective ages. In this implementation, the age of each write cache page is stored and/or updated as the write page is accessed. Any sorting algorithm as may be known in the art may be used to sort the ages of the write cache pages. The ages may be sorted substantially continuously, so that at any moment, one or more of the oldest available write pages may be easily identified and selected. In one implementation, the sorted ages are stored in a data structure having a list of ages. In this implementation, State 1 involves accessing the data structure to find the oldest of the available write cache pages.

In a particular implementation of State 1, the system first identifies the oldest write cache pages and then attempts to use them for read caching. In this implementation, the write cache pages are stepped through in order of oldest to youngest. To illustrate, the oldest write cache page may be selected first to use for read caching. If the oldest write cache page is unavailable for read caching, the next youngest write cache page may be selected, and so on. This process may continue until a predetermined number of write cache pages are identified as available for read caching.

Any method of identifying available write cache pages may be used. An exemplary implementation is one in which an "availability" flag for each write cache page is stored and updated, which keeps track of the availability status of each corresponding write cache page. By way of illustration, the availability flag may be updated when a corresponding write cache page is locked for de-staging, or unlocked after de-staging.

If, in State 1, it is determined that one or more write cache pages are available, the system transitions to State 3, discussed below. If, in State 1, it is determined that no write pages are currently available, the system transitions to State 2, also discussed below.

In other implementations, different triggers, besides, or in addition to host workload type, may be used to transition from State 0 to State 1. Other examples of events that may trigger a transition from State 0 to State 1 are arrival rate of host write requests being greater than the arrival rate of host read requests; the size of each write request being greater than the size of each read request; and the size of read cache being less than a minimum allowable read cache size. Any combination of these trigger events may indicate a need for more read cache.

Referring to State 2, in State 2 write cache pages have been requested to facilitate read caching operations, but the write cache pages are not yet available. In one implementation, State 2 is a "wait" state, wherein the system remains in State 2 until the requested write pages are available. In this implementation of State 2, a function may substantially continuously check for availability of one or more write cache pages. While in State 2, the system may perform functions to free up (i.e., make available) the requested write cache pages, including posting (i.e., de-staging) of write cache data to the mass storage media.

When requested write pages become available in either State 1 or State 2, the system transitions to State 3. In State 3, the request for read cache pages is satisfied using cache pages from the write cache. In one implementation, while in State 3, the free pages are removed from the write cache and added to the read cache. In addition, while in State 3, any control structures that track the size of the read and write cache and the boundary (e.g., the partition 422, FIG. 4) between them may be updated to reflect new read and write cache sizes and a new location of the boundary. By removing available write cache pages from write cache and adding them to the read cache, and updating the relevant control structures, functions executed in State 3 re-characterize the write cache pages to the read cache. After the write cache pages are re-characterized, the system transitions from State 3 back to State 0.

Referring again to State 0, and the implementation in which the host workload type is monitored, the system may be designed to transition to State 4 when the host workload type is a sequential write host workload. Thus, in this implementation of State 0, the system analyzes host requests to determine if the host requests are indicative of a sequential write workload, and if so, the system transitions to State 4. As such, a transition from State 0 to State 4 is triggered, in this implementation, by detection of a sequential write workload.

In this implementation of State 4, more write cache is requested to satisfy the sequential host write workload. While in State 4, the system may determine what percentage and/or what portions of the available read cache should be re-characterized as write cache space. In addition, the system may determine if the requested read cache pages are available (i.e., not locked awaiting completion of some activity) in order to re-characterize the read cache pages as write cache pages.

As discussed previously, in other implementations, different triggers, besides, or in addition to host workload type, may be used to transition out of State 0. Other such events or triggers are discussed above with respect to the transition from State 0 to State 1. These and other events or triggers can likewise cause a transition from State 0 to State 4, depending on the particular implementation.

From State 4, the system may transition to State 5 or State 6. State 5 is entered when the requested read cache pages are not available. In a particular implementation, while in State 5, the system performs functions to free up the requested read cache pages. Such functions may include waiting for a host read to complete so that the page(s) may be freed, waiting for a read cache pre-fetch operation to complete, and the like.

When read cache pages are available in either of State 4 or State 5, State 6 is entered. In State 6, the request for write cache pages is satisfied using cache pages from the read cache. While in State 6, the available requested read cache pages are re-characterized or re-assigned to the write cache. In one implementation, State 6 executes function wherein free pages are removed from the read cache and added to the write cache. As discussed above, with respect to State 3, various tracking or control structures, which track the size of the read and write cache and/or the boundary between the reach cache and the write cache may be updated in State 6.

Figure 6:
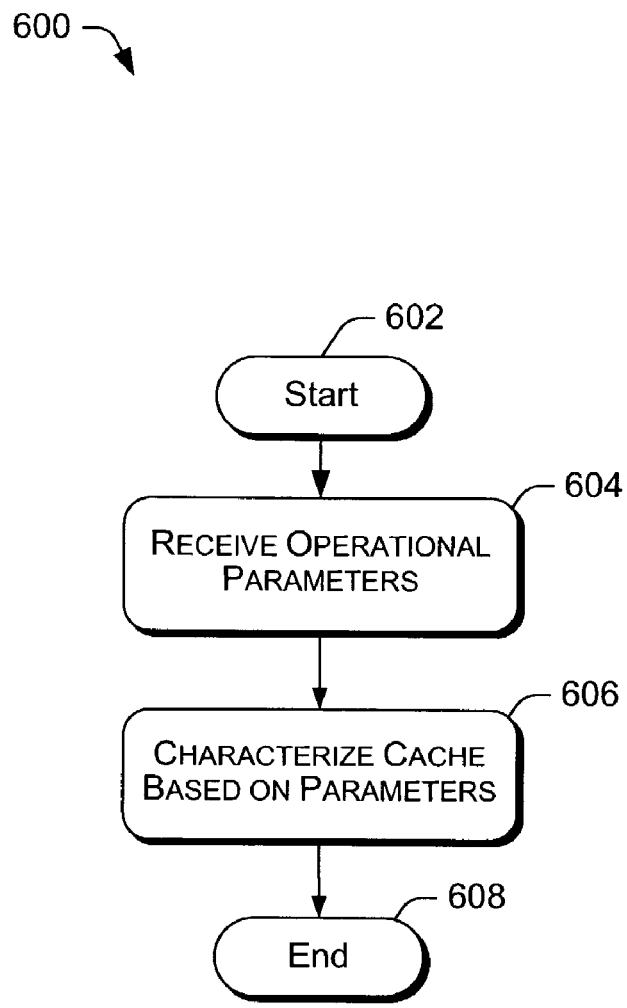

FIG. 6 illustrates an operational flow 600 having exemplary operations that may be executed in the systems of FIGS. 1–4 for adapting a cache partition based on operational parameters. The operation flow 600 may be executed substantially periodically in order to dynamically adjust a cache partition or otherwise characterize portion(s) of cache.

After a start operation 602, a receive operation receives one or more operational parameters characteristic of the system's operation. The operation parameters may include a workload type, a performance metric, a read cache size, a write cache size, or any other parameter indicative of system operation.

A characterize operation 606 characterizes or re-characterizes one or more portions of cache based on the received operational parameters. The characterize operation 606 may dynamically partition the cache into a read cache and a write cache. The characterize operation 606 may adjust (or keep constant) the sizes of the read cache and the write cache to adapt to the operational parameters.

Figure 7:
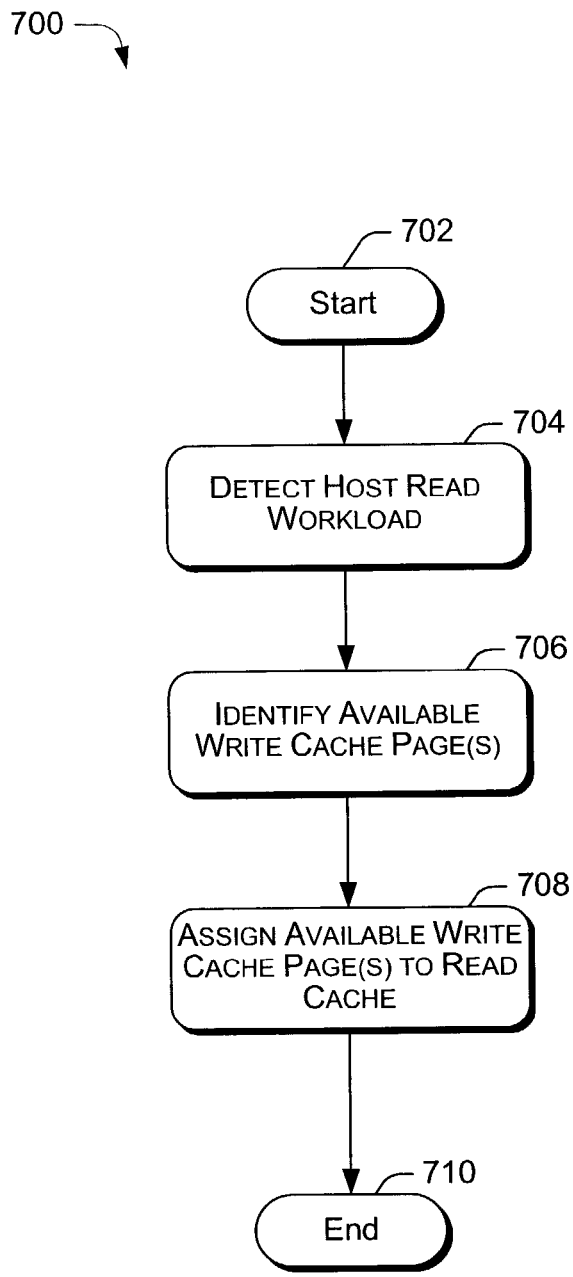
FIG. 7 illustrates an operational flow having exemplary operations that may be executed in the systems of FIGS. 1–4 for dynamically characterizing a portion of write cache as read cache.

FIG. 7 illustrates an operational flow 700 having exemplary operations that may be executed in the systems of FIGS. 1–4 for adapting one or more cache partitions. The one or more cache partitions may be used during caching operations, such as, but not limited to, read cache pre-fetching, write caching, and write cache data de-staging. Generally, the operation flow 700 characterizes one or more portions of cache for various uses based on one or more operational parameters. In one implementation, the operational flow 700 may be viewed as an operation that dynamically partitions the cache.

After a start operation 702, a detect operation 704 detects a host read workload. The detect operation 704 may receive one or more host requests and analyze the requests to determine a host read workload. The one or more host requests originate from one or more hosts (e.g., the host 104, FIG. 1). The one or more host requests comprise an aggregate host workload. As discussed, various types of host workloads exist, such as, but not limited to, host read workload, host write workload, host sequential read workload, host sequential write workload, host small transfer length workload, and random host workload. Each host workload type may be characterized by patterns in the one or more host requests.

In one implementation, the detect operation 704 determines the percentage of read or write requests. If more than 50% of the requests are read requests, the host workload type is a read workload. In another implementation, the detect operation 704 detects a read workload if the average size of read requests is greater than the average size of write requests.

Another implementation of the detect operation 704 employs pattern recognition algorithms to identify host read request patterns and classify a host workload as a host read workload. Another implementation of the detect operation 704 utilizes systems and methods discussed in a concurrently filed and co-assigned U.S. Patent Application entitled, "Method of Detecting Sequential Workloads to Increase Host Read Throughput."

Regardless of the method used to detect a host read workload, an identify operation 706 identifies one or more write cache pages that are available or may become available in the write cache. In one implementation of the identify operation 706, it is determined whether a write cache page is locked or unlocked. If the write cache page is unlocked, the write cache page is available for re-characterization. If the write cache page is locked, the write cache page is not available for re-characterization.

In one implementation of the identify operation 706, the identify operation 706 checks a write cache page status flag to determine availability of a write cache page. If the write cache page is unavailable, this implementation of the identify operation 706 waits for the write cache page to become available. The identify operation 706 may identify more than one available write cache page for re-characterization.

Figure 9:
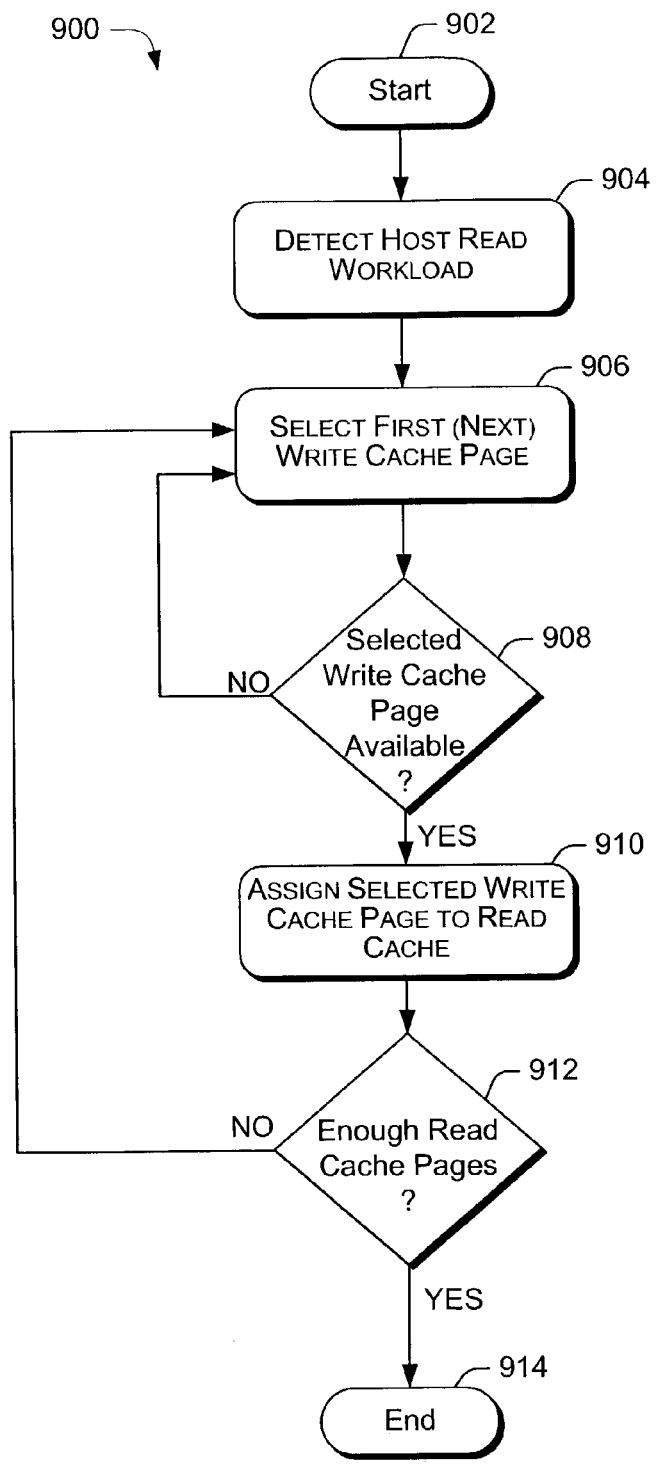
FIG. 9 illustrates an operational flow having exemplary operations that may be executed in the systems of FIGS. 1–4 for dynamically characterizing a portion of write cache as read cache.

In another implementation, the identify operation 706 may iteratively check a plurality of write cache pages for availability. In this implementation, the identify operation 706 may sequence through each of the write cache pages in an order corresponding to the ages of the write cache pages 706. For example, the identify operation 706 may check the oldest write cache page first, followed by the second oldest, and so on, until a desired number of write cache pages are identified for re-characterization. FIG. 9 illustrates one exemplary implementation for the identify operation 706.

An assign operation 708 assigns the identified available write cache pages (from the identify operation 706) to the read cache. The assign operation 708 makes the identified write cache pages available for use for read cache operations. The identified write cache pages may be re-characterized for read cache purposes in a number of ways. In one implementation, the assign operation 708 assigns the identified write cache pages to the read cache by invalidating the identified write cache pages.

In one implementation of the assign operation 708, the assign operation 708 changes a partition memory address variable. The partition memory address variable is used to keep track of a boundary (e.g., the partition 422, FIG. 4) between the read cache and the write cache. This particular implementation may be particularly applicable to an implementation in which the read cache and write cache are logically contiguous. In this implementation, the partition memory address variable may be incremented or decremented by a predetermined value, such as a page size.

In another implementation, wherein the available write cache pages are represented in software as cache page objects, the assign operation 708 updates a cache page type variable in each of the available cache page objects. Thus, in this implementation, the cache page type variable would be changed from write cache type to a read cache type, meaning that the available cache page object may now be used for read caching. This particular implementation may be used in an object-oriented implementation, as well as other types of implementations. Using this implementation, available write cache pages need not be contiguous in the cache, because the cache page objects can each have address information designating where in cache the cache page object refers. The operation flow 700 ends at end operation 710.

Figure 8:
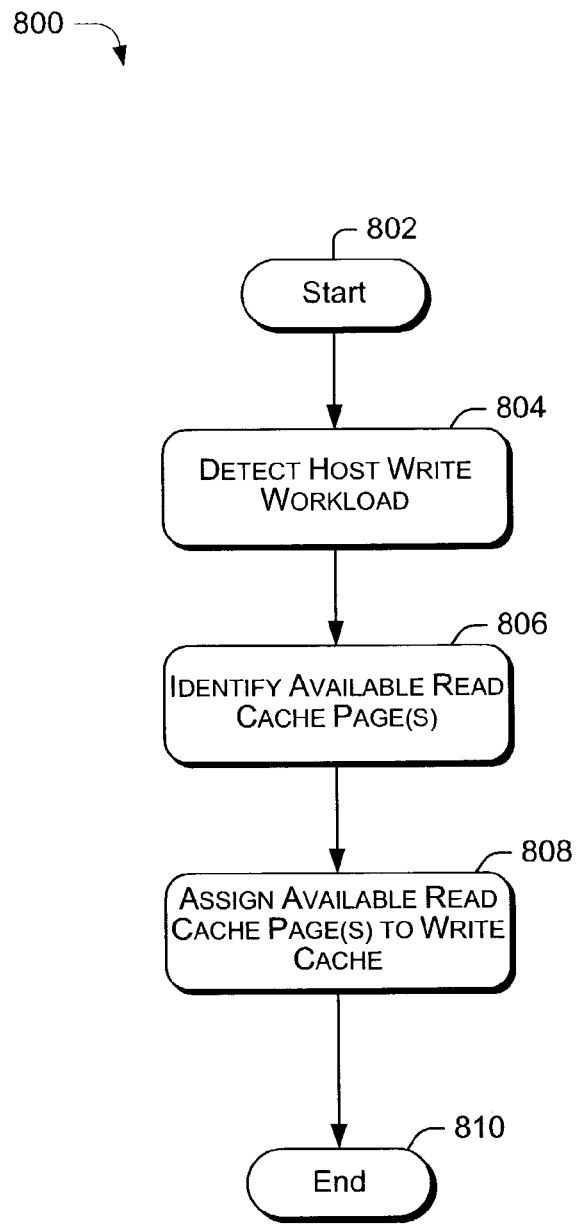
FIG. 8 illustrates an operational flow having exemplary operations that may be executed in the systems of FIGS. 1–4 for dynamically characterizing a portion of read cache as write cache.

FIG. 8 illustrates an operational flow 800 having exemplary operations that may be executed in the systems of FIGS. 1–4 for adapting one or more cache partitions based on a host write workload. As mentioned, cache partitions may be used during caching operations, such as, but not limited to, read cache pre-fetching, write caching, and write cache data de-staging. The operation flow 800 is somewhat analogous to the operation flow 700 of FIG. 7, except that the operation flow 800 characterizes one or more read cache pages as write cache pages. In one implementation, the operational flow 800 may be viewed as an operation that dynamically partitions the cache in response to a host write workload.

After a start operation 802, a detect operation 804 detects a host write workload. The detect operation 804 receives one or more host requests from one or more hosts and analyze the requests to determine an occurrence of a host write workload. In one implementation, the detect operation 804 compares the proportion of write requests to read requests. If more than 50% of the host requests are write requests, the host workload type is a write workload. In another implementation, the detect operation 804 compares the average size of write requests to the average size of read requests, and, if the average size of the write requests is greater, then the host workload is classified as a write workload.

An identify operation 806 identifies one or more read cache pages that are available or may become available in the read cache. In one implementation of the identify operation 806, it is determined whether a read cache page is being accessed to satisfy a host read request or being accessed during a read cache pre-fetch operation. If the read cache page is not being accessed, the read cache page is available for re-characterization. If the read cache page is being accessed, the read cache page is not available for re-characterization.

In one implementation of the identify operation 806, the identify operation 806 checks a read cache page status flag to determine availability of the associated read cache page. If the read cache page is unavailable, this implementation of the identify operation 806 waits for the read cache page to become available. The identify operation 806 may identify more than one available read cache page for re-characterization. In another implementation, the identify operation 806 may iteratively check a plurality of read cache pages for availability. In this implementation, the identify operation 806 may sequence through each of the read cache pages in a predetermined order.

An assign operation 808 assigns the identified available read pages (from the identify operation 806) to the read cache. The assign operation 808 makes the identified write cache pages available for use for read cache operations. The identified read cache pages may be re-characterized for write cache purposes in a number of ways. Some possible methods of re-characterizing an available cache page or re-assigning the available cache page are discussed above with respect to the assign operation 708 in FIG. 7. The methods discussed there are easily adaptable to the assign operation 808, wherein read cache pages are re-assigned to the write cache, and may include invalidating the read cache pages.

FIG. 9 illustrates an operational flow 900 having exemplary operations that may be executed in the systems of FIGS. 1–4 for iteratively checking availability of cache pages that may be dynamically assigned to a read cache. In general, the operation flow 900 repeatedly checks write cache pages for availability until a predetermined number of available write cache pages are identified, or it is determined that not enough write cache pages are available.

After a start operation 902, a detect operation 904 detects a host read workload in a manner similar to the detect operation 704, and as discussed above. The detect operation 904 may also request a number of pages to be allocated to the read cache by generating a requested read cache page count (discussed further below). The requested read cache page count indicates the number of write cache pages that should be assigned to the read cache. A select operation 906 selects a first (or next) write cache page to be checked for availability. In one implementation of the select operation 906, a write cache page object is selected from a list of write cache page objects.

A first query operation 908 determines whether the selected write cache page (from the select operation 906) is available. In one implementation, the first query operation 908 checks an availability status flag of a selected write cache page object, wherein the availability status flag may indicate a locked or unlocked status of the write cache page.

If the first query operation 908 determines that the selected write cache page is not available, the operation flow 900 branches "NO" to the select operation 906, wherein a next write cache page is selected. Upon re-entry into the select operation 906, the select operation may advance to the next write cache page by advancing an address pointer to refer to the address of the next write cache page. Alternatively, the select operation 906 may increment to the next write cache page object in a list of write cache page objects.

In an alternative implementation of the operation flow 900, if the first query operation 908 determines that the write cache page is not available, the operation flow 900 branches "NO" back to the first query operation 908, which again checks for availability of the selected write cache page. In this implementation, the first query operation 908 may repeat the determination of availability using functions such as those described above. Alternatively, the first query operation 908 may place the selected write cache page on an availability queue, which notifies the first query operation 908 when the selected write cache page becomes available.

In yet another implementation, if the first query operation 908 determines that the selected write cache page is not available, the query operation 908 may initiate a de-stage operation. The de-stage operation de-stages, or writes to mass storage, the data in the selected write cache page. By de-staging the data in the selected write cache page, the selected write cache page may be made available for allocation to the read cache. In this implementation, the operation flow 900 may wait for a notification that the write cache page data has been de-staged.

If the first query operation 908 determines that the selected write cache page is available, the operation flow 900 branches "YES" to an assign operation 910. The assign operation 910 assigns the selected available write cache page to the read cache using methods such as those described above with respect to the assign operation 708, in FIG. 7. In addition to re-characterizing the write cache page to the read cache, the assign operation 910 may also increment an assigned write cache counter that keeps track of the number of write cache pages that have been assigned to the read cache. The assign operation 910 may also invalidate the write cache pages that are assigned to the read cache.

A second query operation 912 determines whether enough available write cache pages have been assigned to the read cache. The second query operation 912 may be viewed as a check to determine whether the request for additional read cache pages has been satisfied. In one implementation, the second query operation 912 compares the write cache counter (incremented in the assign operation 910) with the requested read cache page count (generated in the detect operation 904). In another implementation, the second query operation 912 compares the write cache page counter with a predetermined fixed page count.

In another implementation, the second query operation 912 determines whether the size of the remaining write cache is greater than a predetermined minimum allowable write cache size. In this implementation, the second query operation 912 attempts to ensure that the write cache does not drop below a desired minimum amount of memory. The minimum allowable write cache size may be set and stored at initialization or start-up time and may be dependent on the particular implementation, such as desired performance objectives, system latencies, system tolerances, and the like.

If the second query operation 912 determines that enough write cache pages have not been assigned to the read cache, the operation flow 900 branches "NO" to the select operation 906, which selects a next write cache page as discussed above. If the second query operation 912 determines that the read cache contains enough cache pages, the operation flow 900 branches "YES" to an end operation 914.

Figure 10:
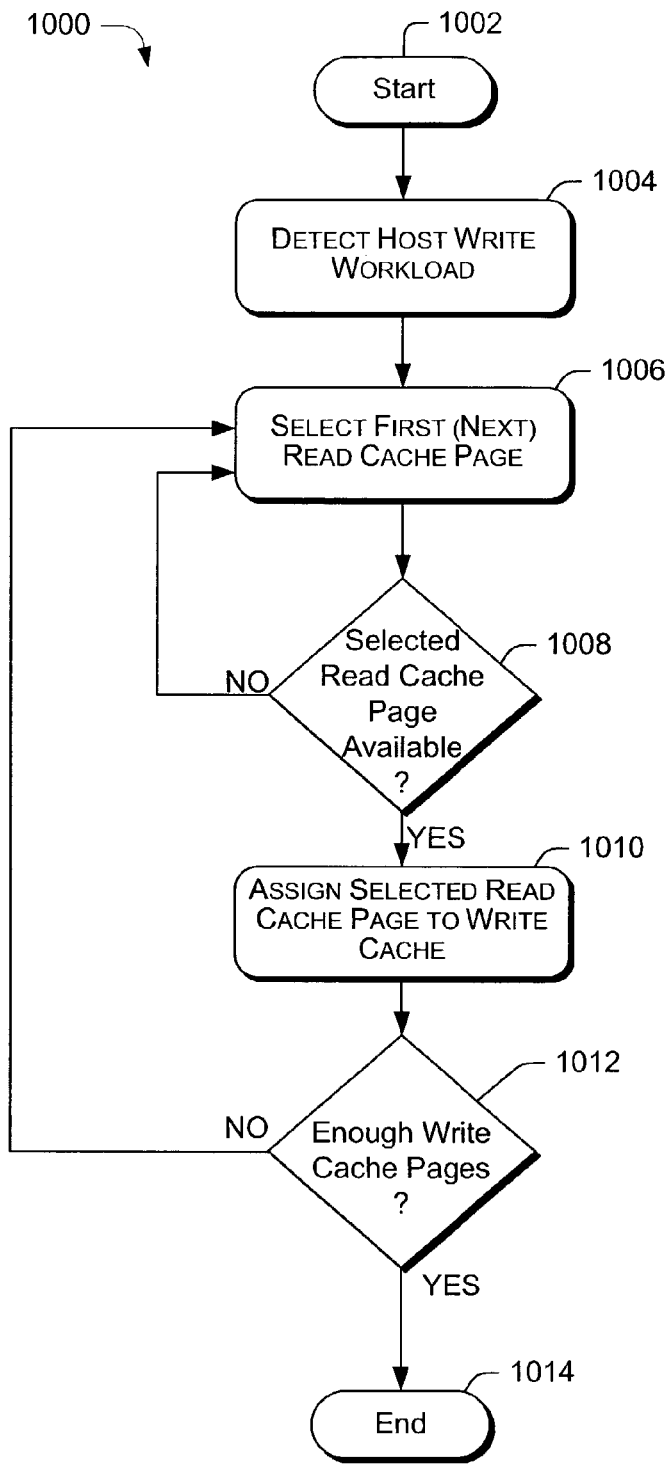
FIG. 10 illustrates an operational flow having exemplary operations that may be executed in the systems of FIGS. 1–4 for iteratively checking availability of read cache pages that may be dynamically assigned to a write cache.

FIG. 10 illustrates an operational flow 1000 having exemplary operations that may be executed in the systems of FIGS. 1–4 for iteratively checking availability of read cache pages that may be dynamically assigned to a write cache. In general, the operation flow 1000 repeatedly checks read cache pages for availability until a predetermined number of available read cache pages are identified, or it is determined that not enough read cache pages are available.

After a start operation 1002, a detect operation 1004 detects a host write workload in a manner similar to the detect operation 804, and as discussed above. The detect operation 1004 may also request a number of pages to be allocated to the write cache by generating a requested write cache page count (discussed further below). The requested write cache page count indicates the number of read cache pages that should be assigned to the write cache. A select operation 1006 selects a first (or next) read cache page to be checked for availability. In one implementation of the select operation 1006, a cache page object is selected from a list of read cache page objects.

A first query operation 1008 determines whether the selected read cache page (from the select operation 1006) is available. In one implementation, the first query operation 1008 checks an availability status flag of the selected read cache page object. The availability status flag may indicate that the selected read cache page is unavailable under several circumstances. For example, the selected read cache page may be being used to satisfy a host read request and/or the read cache page may be being accessed during a read cache pre-fetch operation.

If the first query operation 1008 determines that the selected read cache page is not available, the operation flow 1000 branches "NO" to the select operation 1006, wherein a next read cache page is selected. Upon re-entry into the select operation 1006, the select operation may advance to the next read cache page by advancing an address pointer to refer to the address of the next read cache page. Alternatively, the select operation 1006 may increment to the next read cache page object in a list of read cache page objects.

In an alternative implementation of the operation flow 1000, if the first query operation 1008 determines that the read cache page is not available, the operation flow 1000 branches "NO" back to the first query operation 1008, which again checks for availability of the selected read cache page. In this implementation, the first query operation 1008 may repeat the determination of availability using functions such as those described above. Alternatively, the first query operation 1008 may place the selected read cache page on an availability queue, which notifies the first query operation 1008 when the selected read cache page becomes available.

If the first query operation 1008 determines that the selected read cache page is available, the operation flow 1000 branches "YES" to an assign operation 1010. The assign operation 1010 assigns the selected available read cache page to the write cache using methods such as those described above with respect to the assign operation 808, in FIG. 8. In addition to re-characterizing the read cache page to the write cache, the assign operation 1010 may also increment an assigned read cache counter that keeps track of the number of read cache pages that have been assigned to the write cache. The assign operation 1010 may also invalidate the read cache pages that are assigned to the write cache.

A second query operation 1012 determines whether enough available read cache pages have been assigned to the write cache. The second query operation 1012 may be viewed as a check to determine whether the request for additional read cache pages has been satisfied. In one implementation, the second query operation 1012 compares the read cache counter (incremented in the assign operation 1010) with the requested write cache page count (generated in the detect operation 1004). In another implementation, the second query operation 1012 compares the read cache page counter with a predetermined fixed page count.

In another implementation, the second query operation 1012 determines whether the size of the remaining read cache is greater than a predetermined minimum allowable read cache size. In this implementation, the second query operation 1012 attempts to ensure that the read cache does not drop below a desired minimum amount of memory. The minimum allowable read cache size may be set and stored at initialization or start-up time and may be dependent on the particular implementation, such as desired performance objectives, system latencies, system tolerances, and the like.

If the second query operation 1012 determines that not enough read cache pages have been assigned to the write cache, the operation flow 1000 branches "NO" to the select operation 1006, which selects a next read cache page as discussed above. If the second query operation 1012 determines that the write cache contains enough cache pages, the operation flow 1000 branches "YES" to an end operation 1014.

Although the description above uses language that is specific to structural features and/or methodological acts, it is to be understood that the subject matter of the appended claims is not limited to the specific features or acts described. Rather, the specific features and acts are disclosed as exemplary forms of implementation. In addition, the exemplary operations described above are not limited to the particular order of operation described, but rather may be executed in another order or orders and still achieve the same results described.

I claim:

1. A processor-readable medium comprising processor-executable instructions configured for executing a method for dynamically partitioning a cache in a storage device comprising:
  receiving a plurality of I/O requests, said I/O requests including read requests and write requests;
  based on the I/O requests, determining a read workload and a write workload in relation to a host workload; and,
  dynamically partitioning the cache into read and write caches based on the read and write workloads such that if the host workload comprises a read workload,
    identifying an available portion of the write cache,
    de-staging the available portion of the write cache, and,
    assigning the available portion of the write cache to the read cache.

2. A processor-readable medium as recited in claim 1, wherein the method further comprises invalidating the available portion of the write cache.

3. A processor-readable medium comprising processor-executable instructions configured for executing a method for dynamically partitioning a cache in a storage device comprising:
  receiving a plurality of I/O requests, said I/O requests including read requests and write requests;
  based on the I/O requests, determining a read workload and a write workload in relation to a host workload; and,
  dynamically partitioning the cache into read and write caches based on the read and write workloads such that if the host workload comprises a write workload,
    identifying an available portion of the read cache, and
    assigning the available portion of the read cache to the write cache.

4. A processor-readable medium as recited in claim 3, wherein the method further comprises invalidating the available portion of the read cache.

5. A processor-readable medium as recited in claim 3, wherein the dynamically partitioning the cache comprises:
  comparing a number of read requests to a number of write requests over a period of time.

6. A processor-readable medium as recited in claim 3, wherein the dynamically partitioning the cache comprises:
  comparing a read request size to a write request size.

7. A processor-readable medium as recited in claim 3, wherein the dynamically partitioning the cache comprises:
  comparing the size of the read cache to a predetermined minimum allowable read cache size.

8. A processor-readable medium as recited in claim 3, wherein the dynamically partitioning the cache comprises:
  generating a read proportion value representing the proportion of the cache that is assigned to the read cache;
  generating a write proportion value representing the proportion of the cache that is assigned to the write cache; and
  comparing the read proportion value to the write proportion value.

9. A method comprising:
  receiving at least one host workload parameter characteristic of a host workload comprising plurality of requests from a plurality of host devices;
  determining a workload type indicative of a type of the host workload and if the workload type is a read workload;
    determining whether a write cache includes one or more available write cache pages; and,
    if the write cache includes one or more available write cache pages, dynamically partitioning at least one of the one or more available write cache pages to a read cache.

10. A method comprising:
  receiving at least one host workload parameter characteristic of a host workload comprising a plurality of requests from a plurality of host devices; and,
  determining a workload type indicative of a type of host workload and if the workload type is a read workload;
    determining whether a size of a write cache is greater than a predetermined minimum allowable write cache size; and,
    if the size of the write cache is greater than the predetermined minimum allowable write cache size, dynamically partitioning a portion of the write cache to a read cache.

11. A method comprising:
  receiving at least one host workload parameter characteristic of a host workload comprising a plurality of requests from a plurality of host devices;
  determining a workload type indicative of a type of host workload and if the workload type is a write workload:
    determining whether a size of a read cache is greater than a predetermined minimum allowable read cache size; and,
    if the size of the read cache is greater than the predetermined minimum allowable read cache size, dynamically partitioning a portion of the read cache to a write cache.

12. A method comprising:
  receiving at least one host workload parameter characteristic of a host workload comprising a plurality of requests from a plurality of host devices;
  determining a workload type indicative of a type of host workload and if the workload type is a write workload;
    determining whether a read cache includes one or more available read cache pages; and,
    if the read cache includes one or more available read cache pages, dynamically partitioning at least one of the one or more available read cache pages to a write cache.

13. A method comprising:
  receiving at least one host workload parameter characteristic of a host workload comprising a plurality of requests from a plurality of host devices;
  determining a workload type indicative of a type of a host workload and if the workload type is a write workload:
    determining whether a size of a read cache is greater than a predetermined minimum allowable read cache size, and
    determining whether a portion of the read cache is nonvolatile; and;

if the size of the read cache is greater than the predetermined minimum allowable read cache size and the portion of the read cache is nonvolatile, dynamically partitioning the nonvolatile portion of the read cache to a write cache.

14. A storage device comprising:
a mass storage medium;
a dynamically partitionable cache memory;
an input/output module operable to receive requests from a host device and communicate data between the mass storage medium and the cache memory; and,
a cache adaptor in operable communication with the cache memory and the input/output module, operable to dynamically partition the cache memory into a read cache and a write cache in response to requests from the host device wherein the cache adaptor is further operable to identify an available page in the cache memory and assign the available page to either the read cache or the write cache.

15. A storage device comprising:
a mass storage medium;
a dynamically partitionable cache memory;
an input/output module operable to receive requests from a host device and communicate data between the mass storage medium and the cache memory; and,
a cache adaptor in operable communication with the cache memory and the input/output module, operable to dynamically partition the cache memory into a read cache and a write cache in response to requests from the host device wherein the cache adaptor is further operable to identify a locked page in the write cache, wait until the unavailable/locked page becomes unlocked, and assign the available/unlocked page to the read cache.

16. A storage device comprising:
a mass storage medium;
a dynamically partitionable cache memory;
an input/output module operable to receive requests from a host device and communicate data between the mass storage medium and the cache memory; and,
a cache adaptor in operable communication with the cache memory and the input/output module, operable to dynamically partition the cache memory into a read cache and a write cache in response to requests from the host device wherein the cache adaptor is further operable to identify an unlocked page in the write cache, and assign the unlocked page to the read cache.

17. A storage device comprising:
a mass storage medium;
a dynamically partitionable cache memory;
an input/output module operable to receive requests from a host device and communicate data between the mass storage medium and the cache memory; and,
a cache adaptor in operable communication with the cache memory and the input/output module, operable to dynamically partition the cache memory into a read cache and a write cache in response to requests from the host device wherein the cache adaptor is further operable to identity an unavailable page in the read cache, wait until the unavailable page becomes available, and assign the available page to the write cache.

18. A storage device as recited in claim 16, wherein the cache adaptor is further operable to determine whether the read cache size is greater than a predetermined minimum and prevent assigning a read cache page to the write cache if the read cache size is not greater than the predetermined minimum.

19. A storage device comprising:
a mass storage media;
a cache in operable communication with the mass storage media;
an input/output module operable to receive host requests from a plurality of host devices; and,
means for dynamically assigning a portion of the cache to a read cache or a write cache based in part on the host requests, wherein the means for dynamically assigning a portion of the cache is further operable to identify one or more available cache pages to be assigned to the read cache or the write cache.

20. A storage device comprising:
a mass storage media;
a cache in operable communication with the mass storage media;
an input/output module operable to receive host requests from a plurality of host devices; and,
means for dynamically assigning a portion of the cache to a read cache or a write cache based, in part, on the host requests wherein the means for dynamically assigning a portion of the cache is further operable to identify an unavailable cache page, wait for the unavailable cache page to become available, and assign the available cache page to either the read cache or the write cache.

21. A storage device comprising:
a mass storage media;
a cache in operable communication with the mass storage media;
an input/output module operable to receive host requests from a plurality of host devices; and,
means for dynamically assigning a portion of the cache to a read cache or a write cache based, in part, on the host requests, wherein the means for dynamically assigning a portion of the cache is further operable to identify an available write cache page, and assign the available write cache page to the read cache.

22. A storage device comprising:
a mass storage media;
a cache in operable communication wit the mass storage media;
an input/output module operable to receive host requests from a plurality of host devices; and,
means for dynamically assigning a portion of the cache to a read cache or a write cache based, in part, on the host requests, wherein the means for dynamically assigning a portion of the cache is further operable to detect a host read workload, responsively identify an available write cache page, and assign the available write cache page to a read cache page.

23. A storage device comprising:
a mass storage media;
a cache in operable communication with the mass storage media;
an input/output module operable to receive host requests from a plurality of host devices; and,
means for dynamically assigning a portion of the cache to a read cache or a write cache based in part on the host requests, wherein the means for dynamically assigning a portion of the cache is further operable to detect a host write workload, responsively identify an available read cache page, and assign the available read cache page to the write cache.

* * * * *

UNITED STATES PATENT AND TRADEMARK OFFICE
CERTIFICATE OF CORRECTION

| | | |
|---|---|---|
| PATENT NO. | : 7,058,764 B2 | Page 1 of 1 |
| APPLICATION NO. | : 10/414188 | |
| DATED | : June 6, 2006 | |
| INVENTOR(S) | : Brian S. Bearden | |

It is certified that error appears in the above-identified patent and that said Letters Patent is hereby corrected as shown below:

In column 1, line 15, delete "10/414,180" and insert -- 10/414,189 --, therefor.

In column 22, line 8, in Claim 9, after "comprising" insert -- a --.

In column 22, line 12, in Claim 9, delete "workload;" and insert -- workload: --, therefor.

In column 22, line 24, in Claim 10, delete "workload;" and insert -- workload: --, therefor.

In column 22, line 50, in Claim 12, delete "workload;" and insert -- workload: --, therefor.

In column 23, line 59, in Claim 17, delete "identity" and insert -- identify --, therefor.

In column 24, line 41, in Claim 22, delete "wit" and insert -- with --, therefor.

Signed and Sealed this

Thirteenth Day of July, 2010

David J. Kappos
*Director of the United States Patent and Trademark Office*